United States Patent
Bala et al.

(10) Patent No.: US 6,650,747 B1
(45) Date of Patent: Nov. 18, 2003

(54) CONTROL OF MERCHANT APPLICATION BY SYSTEM MONITOR IN VIRTUAL CONTACT CENTER

(75) Inventors: Srinivas Bala, Dayton, NJ (US); Mark Jeffrey Foladare, Kendall Park, NJ (US); Kathleen C. Fowler, Manasquan, NJ (US); Shelley B. Goldman, East Brunswick, NJ (US); Shaoqing Q. Wang, Middletown, NJ (US); Roy Philip Weber, Bridgewater, NJ (US); Robert S. Westrich, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/490,887

(22) Filed: Jan. 27, 2000

Related U.S. Application Data (63) Continuation-in-part of application No. 09/318,015, filed on May 25, 1999, which is a continuation-in-part of application No. 08/933,518, filed on Sep. 18, 1997, now Pat. No. 6,049,602.

(51) Int. Cl.[7] .......................... H04M 3/00; H04M 5/00; G06F 15/173
(52) U.S. Cl. .................................. 379/265.06; 709/224
(58) Field of Search ...................... 379/265.02, 265.06, 379/265.07, 266.01, 265.04, 265.03, 266.09, 309; 709/224, 223, 317; 370/352

(56) References Cited

U.S. PATENT DOCUMENTS

| 5,459,780 A | 10/1995 | Sand ..................... 379/266.09 |
| 5,696,811 A | 12/1997 | Maloney et al. ........ 379/265.07 |
| 5,790,798 A | 8/1998 | Beckett et al. .............. 709/224 |
| 6,047,060 A | 4/2000 | Fedorov et al. ......... 379/265.02 |
| 6,510,220 B1 | 1/2003 | Beckett et al. ......... 379/265.06 |

Primary Examiner—Benny Tieu (57) ABSTRACT

A virtual contact center (VCC) system includes facilities for full participation by a VCC monitor in a transaction between a customer and a customer service representative (CSR) using virtual network computing (VNC) techniques. A second display system remote from a first computer system actively views and controls the computing desktop at the first computer.

Thus, one or more virtual contact center monitors can simultaneously view a CSR desktop, including windows containing merchant applications. Moreover, use of VNC programs permits a monitor to directly control the selection, display, data entry and interaction with such merchant applications and customer in exactly the same manner, and to the same extent, as a CSR.

22 Claims, 3 Drawing Sheets

| PSTN NO. | LOGGED ON? | EQUIP | SCHEDULED? | LANGUAGE | IP ADDRESS | DESKTOP ID(s) |
|---|---|---|---|---|---|---|
| (908) 555 1234 | Y | T, C, V | Y | ENG | XXXX•••XX | DXXX-1 |
| (602) 555 1234 | Y | T, C | Y | ENG SPAN | XXXX•••XX | DYYY-1 DYYY-2 |
| 011-33-1-XXXXXXX | Y | T, C | Y | ENG FREN | XXXX•••XX | |
| (415) 555-1234 | N | T, C | Y | ENG FREN GER | XXXX•••XX | DZZZ-1 |

CONTROL OF MERCHANT APPLICATION BY SYSTEM MONITOR IN VIRTUAL CONTACT CENTER

RELATED APPLICATIONS

This application is a continuation-in-part application based on earlier applications:

(i) M. J. Foladare, et al, entitled Virtual Call Center, Ser. No. 08/933,518, filed Sep. 18, 1997 now U.S. Pat. No. 6,049,602 and (ii) M. J. Foladare, et al, entitled Method and System for Providing Communication Control Functionality at a Remotely Located Site, Ser. No. 09/318,015 filed May 25, 1999.

The cited parent applications are assigned to the same assignee as the present application, and are hereby incorporated by reference as if set forth in their entirety herein.

In addition, the present application is related to the following applications by the same inventors as the present application and filed on the same day as the present application; these applications are owned by the same assignee as the present application and are hereby incorporated by reference as if set forth in their entirety herein.

(iii) Virtual Contact Center with Enhanced Language Capabilities;

(iv) Virtual Contact Center Serving Public Transaction Terminals;

(v) Enhanced Agent Authentication in Virtual Contact Center;

(vi) Virtuai Contact Center with Flexible Staffing Control.

FIELD OF THE INVENTION

The present invention relates generally to the field of communications systems. More particularly, the present invention relates, in one aspect, to communications contact centers, including distributed or virtual call center (VCC) functionality. Still more particularly, aspects of the present invention relate to virtual contact centers incorporating enhanced monitoring and control of interactive sessions between customers and call center customer representatives.

BACKGROUND OF THE INVENTION

Previous patent applications (i) and (ii) cited above, describe network-based interaction between calling parties, a call control server, a merchant server and one or more agents or customer service representatives (CSRs), which CSRs may be distributed over a number of locations remote from the customer and servers. Using high speed data networks, including the Internet, and/or the public switched telephone network (PSTN) customers contact CSRs in a controlled manner, with sufficient information available at CSR stations to answer customer questions, receive customer orders, or otherwise to serve customer needs. Such network arrangements are referred to as virtual call centers.

In some cases, a customer will originate a telephone call that is extended to a CSR exclusively over the PSTN, but under the control of the call control server. In other cases, a customer may be in controlled contact with a CSR exclusively over a data connection, and in other cases contact between the customer and CSR will include both a data network portion and a PSTN portion. It proves useful to employ the term virtual contact center in the present application (and the concurrently filed incorporated applications) to refer to virtual call centers that service non-voice contacts (or voice contacts combined with non-voice contacts.) Callback techniques, by which calls are originated by a CSR in response to a contact made by a customer to a merchant location over a data link, prove attractive to customers for some merchant applications. Using well-known voice-over-IP (VOIP) techniques, a voice call may be carried over a data network for all or part of its extent.

Network controls to enhance network and transaction security typically include voice and CSR data terminal login procedures, and selective dissemination of merchant and control pages to CSRs and customers. Provision is readily made for CSRs to login and logoff at the beginning and end of a work shift, and to accommodate periodic CSR breaks. Additionally, when customer calling rates are not sufficient to keep scheduled CSRs occupied, the earlier-described systems and methods provide flexibility in temporarily releasing CSRs to pursue other activities. Because CSRs may be working from home or other non-traditional workplaces, such releases often prove very attractive to CSR personnel.

While the term customer is clearly appropriate for network-based sales transactions using the described techniques, the term applies equally well when callers seek information, assistance and other services as well. Thus, for example, the prior teachings of incorporated patent applications, (i) and (ii) will prove useful in providing library and other reference and consulting functions, in emergency and disaster applications, in political and other polling applications and a host of other applications. Incorporated patent applications (iii) through (vi) cited above likewise further illustrate (but by no means exhaust) contexts and services to which the prior inventive teachings may be applied. Simplicity of presentation dictates that the present description be based on an illustrative sales transaction context, i.e., the merchant will be assumed to be a supplier of goods or services. Those skilled in the art will recognize that the present inventive systems, techniques and principles will also apply to many other particular contexts. The term merchant will therefore be understood to include many non-merchant contexts, e.g., emergency service call centers.

Problems to be Solved

While solutions provided by the several incorporated patent applications prove very useful in a wide variety of applications, certain customer-agent interactions present special concerns or deal with transactions of particular kinds necessitating different treatment. Thus, for example, customer service representatives may lack appropriate experience to deal with exceptional circumstances, or his/her training may not be up to date on some procedures, products or service offerings. To allow for these circumstances, prior call centers, including virtual call centers described in one or more of the above-cited incorporated patent applications, typically provide for supervisors or more experienced monitor representatives to be added to a customer call to a customer service representative. Such monitoring may, as well, proceed on a random or on a selective basis, including monitoring based on prior experience with particular CSRs, or to meet particular regulatory requirements. See generally, E. Muraskin, "Call Monitoring & Recording," *Computer Telephony.com*, July 1999, pp. 78–91.

Such monitoring has previously been limited to participation by monitoring personnel (hereinafter a monitor, or monitors) in a one-way (listen-only) or, sometimes, a three-way connection with customer and CSR also participating.

In some cases a monitor may communicate with a CSR separately via a computer link established with a monitored CSR to give advice and direction as required. It also proves useful for a monitor, upon listening to a transaction, to bridge onto the voice conversation between the agent and a customer. In other cases it may be necessary for the monitor to contact a call control server to have the call and any associated computer links (including those to a merchant application) transferred to the monitor's location for further processing of an on-going transaction.

Heretofore, full participation in, and control of, an on-going transaction between a customer and a CSR, which participation and control include use of a merchant application has not been possible in virtual call centers of the type described in the several incorporated patent applications cited above. That is, a monitor may transfer a call to his/her location in place of the original CSR, but heretofore has not been able to participate in all aspects of the transaction while continuing to involve the CSR.

SUMMARY OF THE INVENTION

Limitations of the prior art are overcome and a technical advance is made, and the above-cited and other problems are solve in accordance with the present invention described in illustrative embodiments herein.

In accordance with one embodiment of the present invention, a virtual call center system includes facilities for full participation by a VCC monitor in a monitored transaction between a customer and a CSR using virtual network computing (VNC) techniques. Briefly, VNC provides a second display system remote from a first computer system (usually including a first display system) that permits a person at the second display system to view and (by use of illustrative basic input devices) control the computing desktop at the first computer. Here, as in common usage, desktop refers to available resources, such as are represented by icons and windows displaying software application activity (e.g., pages of text, forms, images and the like) displable on a CRT or similar screen. Such resources are selectable and/or subject to modification using devices such as a keyboard and mouse. The second display system is thus advantageously used for selecting, entering input and observing results of execution at a first computer.

In other words, a person at the second display system can control operations at the first computer in the same way as a person at the first computer system. Requirements for each second display system are minimal, and any one of several second display systems may be employed at the same time. Importantly, the second display systems may be located remotely from each other and from the first computer system, with the several systems connected using a local or wide area network, such as the Internet.

Using VNC techniques, one or more virtual call center monitors may simultaneously view the desktop, including windows containing merchant applications, presently displayed at the desktop of a CSR. Moreover, as circumstances may require, a monitor can directly control the selection, display, data entry and interaction with such merchant application and current customer in exactly the same manner, and to the same extent, as a CSR.

It will be recognized that applications for the present invention extend beyond voice-based virtual call centers, and will include monitoring and control of sessions in varying contexts and employing a variety of media, protocols, data forms and merchant or other applications. Thus, for example, messages, graphical and other data, images of many kinds, as well as voice or other audio information, will be monitored and controlled using embodiments of the present invention in meeting particular application environments.

BRIEF DESCRIPTION OF THE DRAWING

The above-summarized description of illustrative embodiments of the present invention will be more fully understood upon a consideration of the following detailed description and the attached drawing, wherein.

DETAILED DESCRIPTION

Illustrative System Overview

Figure 1:
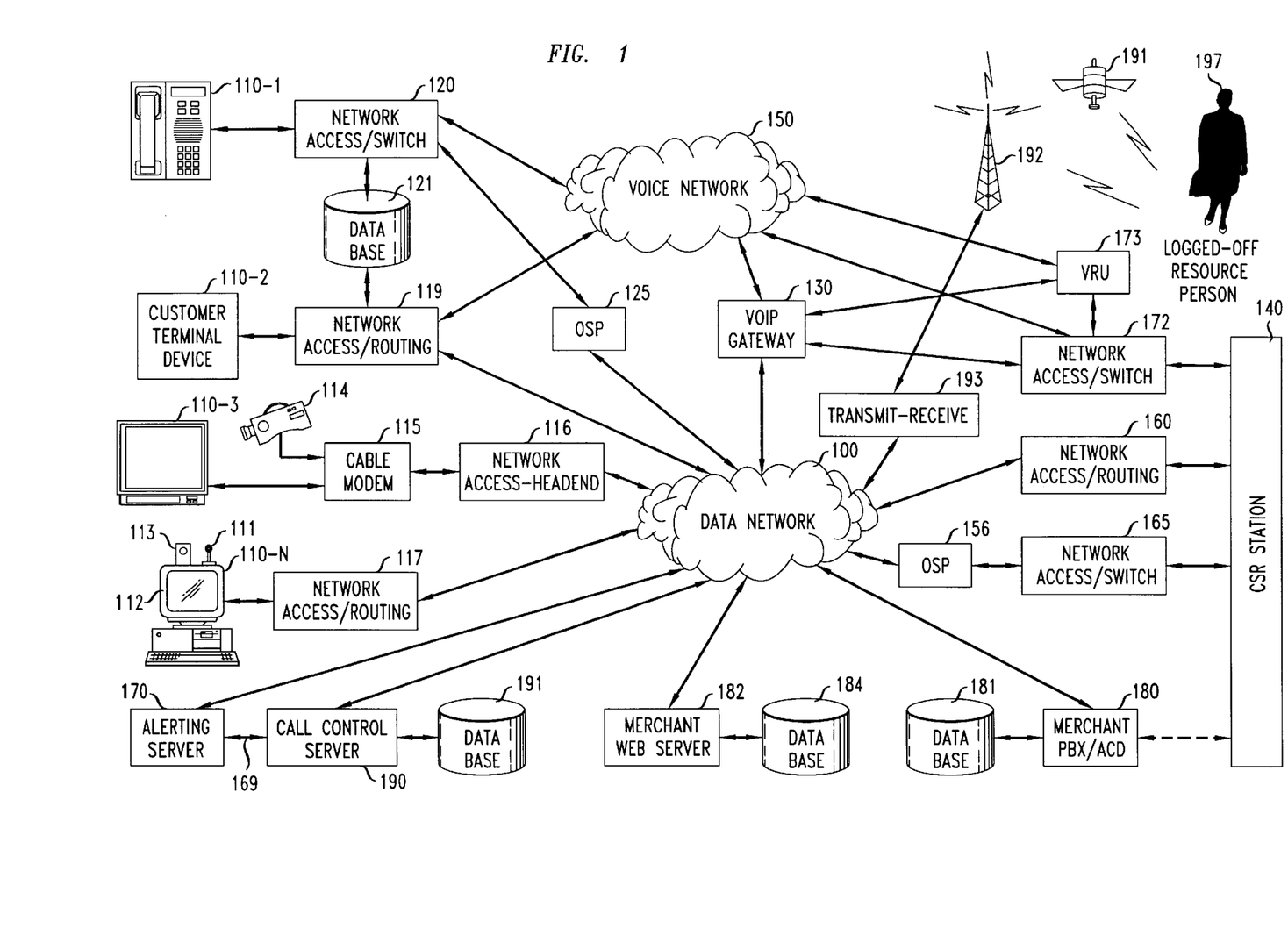
FIG. 1 is an overall view of a network-based call center system including elements of an illustrative embodiment of the present invention.

FIG. 1 shows an illustrative network-based call center system including elements of an illustrative embodiment of the present invention. That system is based generally on the teachings of the incorporated applications (i) and (ii), but also includes elements for achieving current inventive features.

More particularly, FIG. 1 shows a plurality of customer terminal devices 110-i, i=1, 2, ..., N, interacting through a voice network 150 and/or a data network 100 with one or more CSR stations (an illustrative one of which is identified as 140), a web merchant web server 182, and a call control server 190. The "voice" network 150 is typified by the PSTN, or portions thereof, though it will be recognized that modem and other data signals routinely traverse such voice networks.

Illustrative customer terminal devices for use in the system of FIG. 1 include telephone station equipment 110-1. This telephone station equipment is shown connected through a network access device, including, as appropriate to the caller, a PBX or other switch (or other access device, including dedicated line/trunk facilities) 120 providing access to network 150, and, via online service provider (OSP) 125, to data network 100. Switch/access device 120 illustratively is provided access to a network database 121 for, among other purposes, obtaining routing information, as for routing 8xx calls.

Another customer terminal device shown in FIG. 1 is an interactive video arrangement including a television or other display 110-3 (including loudspeakers) and video camera (including audio pickup) 114 connected through an illustrative cable modem 115 to a network access device, typically a cable head end system 116, to data network 100. It will be recognized by those skilled in the art that in one configuration, some or all of the combination of display 110-3, camera 114 and modem 115 may be integrated as a single device adapted for communicating over a broadband data network, such as the Internet.

Terminal 110-N shown in FIG. 1 is a personal computer or workstation having typical processor, memory and input/output facilities (including a sound card and associated software), and typically running an operating system with a graphical user interface and a browser or similar software for accessing, downloading and displaying World Wide Web (WWW) materials. Like terminal 110-3, terminal 110-N will typically include audio and video input devices, represented by microphone 111 and video camera 113, and normal audio output (not shown). Add-in software such as QuickTime from Apple Computer Corp. and a current version of Real-Player from RealNetworks, Seattle, Wash., provide real-time video and audio communication between terminal 110-N and IP network devices. Other commercially available software, advantageously compatible with ITU Recommendation H.323 also proves useful in providing real-time multimedia communications between devices connected to network 100.

Terminal 110-N, with its peripherals, gains access to data network 100 through an appropriate network access/routing device 117, which may be a modem for voice grade lines through an OSP or other access service, or a broadband access device such as an ADSL or cable modem through an appropriate network access connection.

To emphasize that customer terminal devices 110-i are not limited to traditional computer and telephony devices, FIG. 1 includes customer terminal device 110-2. Device 110-2 may include any or all of any of the other devices 110-i and, in addition or instead, may include sensors of many kinds, whiteboard input/output devices or other input/output devices. Similarly, customers may access CSR personnel using portable handheld devices such as cellular telephones and portable computers and other Internet access devices. In each case access to one or more data networks, such as network 100, or a voice network, such as 150 in FIG. 1, is accomplished using well-known access interconnection devices and media appropriate to the customer terminal device used. As shown in FIG. 1 a network access device such as 119 in FIG. 1 will, in some applications, employ a network database for additional routing or control purposes.

A single illustrative CSR station 140 is shown in FIG. 1 to avoid unnecessary clutter in that figure. However, it will be recognized that, in general, a plurality (often many) such CSR stations will be logged-in through data network 100 and, in appropriate circumstances, voice network 150 for purposes of voice and/or data communication with one or more customers at customer terminal devices 110. The incorporated patent applications (i) and (ii) describe appropriate login procedures that prove useful in authenticating both the CSR station (in the form of a computer authentication and/or telephone authentication) and the CSR him/herself. While CSR station 140 usually includes at least a telephone station and a computer/workstation generally of the types used by calling customers, it will be understood that other computational or communications devices, including those available to calling customers, will be available at a CSR station as requirements dictate.

Access by CSR station 140 to the network 150 is illustratively accomplished through a network switch, such as provided by a local access carrier (LEC). Such a switch, shown as 172 in FIG. 1 may access a database like that shown as 121 in FIG. 1. Thus, for example, station 140 may be part of a network-based virtual private network (VPN) defined and controlled by information stored in such a network database. The network database will be incorporated into switch 172 in appropriate cases.

Also shown connected to switch 172 is a voice response unit (VRU) 173 of standard design for generating voice messages for delivery to calling (or called) customers. Thus, for example, a caller to an 8xx number seeking connection to a CSR will often be asked to key, speak or otherwise indicate one of a plurality of items of identifying or selecting information—such as a class of products or a subset of services (e.g., technical support). A VRU message may, in appropriate cases be sent in response to a CSR-selection, e.g., an item selected on a merchant form or a clickable button on a CSR computer screen. A call control server 190 (to be described below) may also command the VRU to function in like manner.

CSR station 140 may connect to network 100 directly through a router or other network edge device shown as 160 in FIG. 1. Alternatively station 140 may access data network 100 through a dialup or other access arrangement or switch (shown as 165 in FIG. 1) and further through an OSP or other access service shown as 156 in FIG. 1. OSP 156 may, for example, include facilities provided by AT&T Worldnet (sm) Service.

In addition, network switch 172 may provide access by CSR station 140 to data network 100 (or vice versa) for voice communications by routing a call through a voice over Internet Protocol (VOIP) gateway well known in the art and shown as 130 in FIG. 1. Once a voice call from a CSR station enters data network 100 it may be delivered to a customer terminal in a form suitable to that terminal device. Thus, for example, voice data packets from the call may be routed to another (or the same) VOIP gateway for delivery over voice lines to a customer. See, for example, D. Minoli and E. Minoli, *Delivering Voice over IP Networks*, John Wiley & Sons, 1998.

Also shown in FIG. 1 are merchant PBX and Automatic Call Distributor (ACD) 180 connected to data network 180. This switch/ACD combination is well known in the art as the means usually employed in locally arranged or locally networked CSR stations to which an ACD distributes incoming calls. Database 181 is conveniently shown connected to merchant PBX/ACD 180 for purposes of providing customer and account information as required. Thus, depending on proximity to merchant PBX/ACD CSR station 140 may, if appropriately located with respect to merchant PBX/ACD 180 gain access to networks 100 and 150 (and to required accounting and related customer data) through such a merchant PBX/ACD. As noted above, CSR station 140 may be one of many similarly situated, though one or many other CSR stations may be distributed at locations geographically remote from a merchant PBX/ACD and each other. Thus, CSR station 140 is shown connected to merchant PBX/ACD 180 by broken lines; in some cases the indicated path will exist, while in others any such required voice or data exchanges are accomplished through data network 100, including VOIP connections thereto. The indicated broken-line path represents one or more voice lines, broadband links or other communications paths as appropriate to a particular circumstance.

As described in incorporated patent applications (i) and (ii), control of (among other things) calls to CSRs is accomplished largely by a call control server 190. Call control server 190 conveniently either includes or is in contact (directly or through a network) with a VRU, such as VRU 173 to direct the issuance of voice messages to calling customers. Call control server 190 also interacts with CSR station 140 for authentication of the user and computer, as is described in the incorporated patent applications (i) and (ii). Database 191, shown connected to call control server 190, is conveniently used to store and access information relating, inter alia, to CSRs, supervisors, consultants and other related personnel—and the logged-in (or not) status of each.

Though not described in detail here, it will be appreciated that the login and authentication of CSRs and CSR computers (and other CSR station elements) is described in detail in the incorporated patent applications (i) and (ii). Such CSR-related authentication is, of course, at least as important in processing calls from, public terminals as for calls originating from customer homes and offices. For convenience of reference, however, it will be assumed that each CSR initially logs in with call control server 190 using (among other possible login protocols) login ID and password information. Then, call control server 190 calls a voice terminal at CSR station 240 and illustratively delivers a voiced requirement to enter keyed inputs (such as a DTMF sequence) or voice inputs to be analyzed by call control server 190. When this procedure is successfully completed, a high level of certainty that the purported CSR and CSR station equipment is authentic.

Also shown connected to data network 100 in FIG. 1 is merchant web server 182 for making available online information, including merchant web pages, and other information that may be of use in conducting business online and in cooperation with CSRs. Call control server 190 advantageously interacts with merchant web server 182 to select, authenticate and otherwise control access to merchant information and CSRs for facilitating business on behalf of the merchant. Call control server 190 also advantageously interacts with merchant PBX/ACD 180 both in respect of controlling and coordinating call distribution to CSRs and others, and in respect to paging and related functions in some applications.

While shown independently connected to data network 100 in FIG. 1, merchant web server 182, merchant PBX/ACD 180 and call control server 190 (or some combinations of them) may be otherwise linked by a local area network (LAN), wide area network (WAN) or other network. In some cases merchant web server 182 may act as a front end for a call control server, e.g., a selection by a customer on a page downloaded from a merchant server may trigger one or more messages to a cognizant call control center from the merchant web server. It will be recognized that two or more of the merchant web server 182, merchant PBX/ACD 180 and call control server 190 may be combined in a multi-function network device in some embodiments of the present invention.

Of course, a call control server 190 can perform the same or related functions for each of a plurality of merchants, and each of a plurality of not necessarily mutually exclusive groups of CSRs. Thus, some CSRs may be qualified (or authorized) to work on behalf of two or more merchants, while others may not. In any event, call control server 190 is advantageously arranged to deliver ("push") web pages or other organized information to appropriate customers, CSRs and others (supervisors, specialists, etc.). It may prove useful in some applications to have separate (distributed) call control centers if appropriate for call-volume or geographical reasons, or for purposes of segregating calls associated with a particular merchant.

Enhanced Monitoring Capabilities in a Virtual Call Center—Overview

Figure 2:
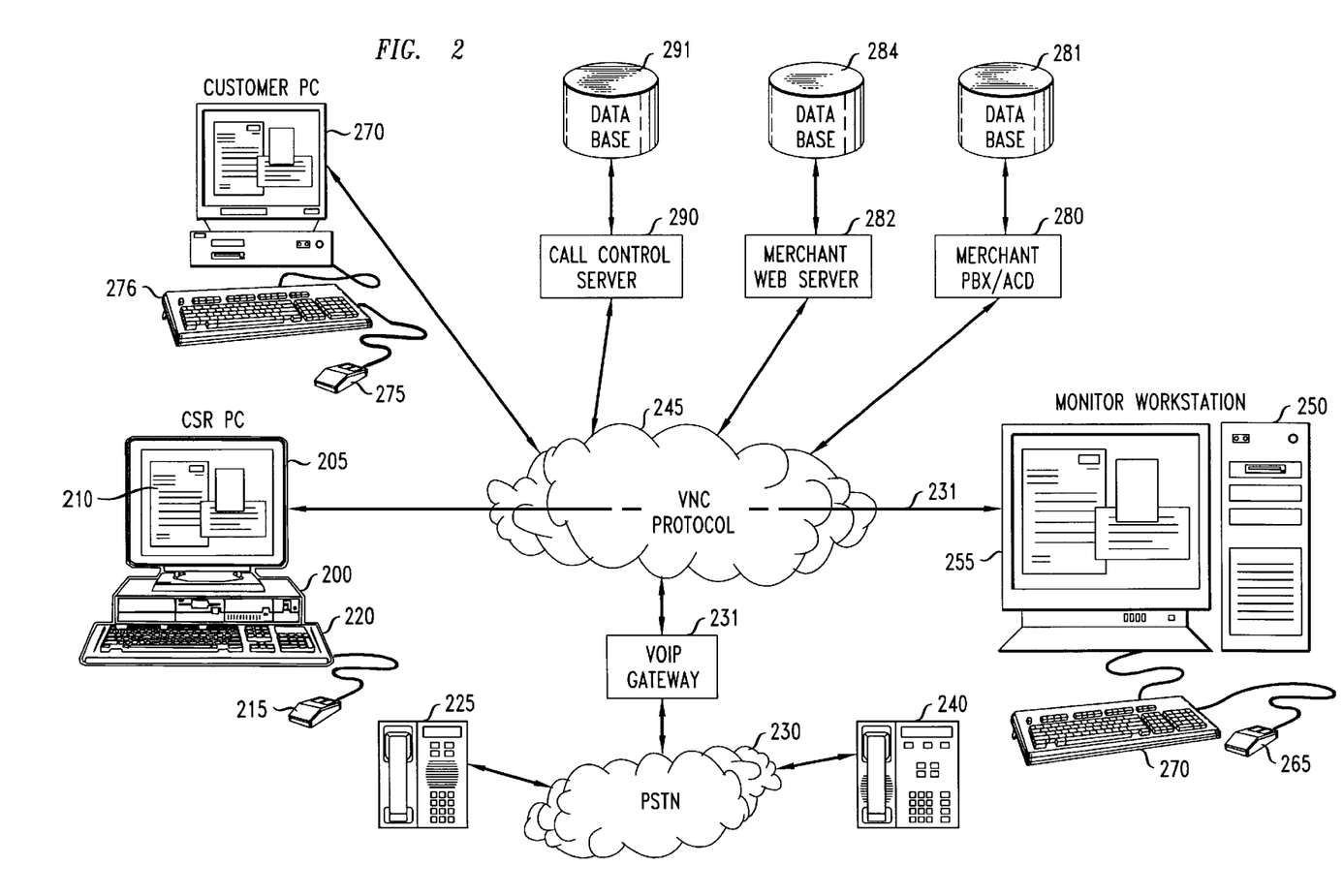
FIG. 2 shows monitoring facilities in accordance with an illustrative embodiment of the present invention.

FIG. 2 shows portions of the virtual call center system of FIG. 1 with a customer at personal computer (PC) 270 communicating over one or more networks 245 with illustrative CSR station 200. For illustrative purposes, customer PC 270 includes normal display facilities, mouse or other pointing device 275, keyboard input 276 and internet browser software well-known in the art to view web pages and the like as part of a transaction with CSR at CSR station 200. Customer PC 270 illustratively includes voice-processing facilities, such as one of several well-known sound cards for converting speech into data packets for transmission over data networks, such as the Internet, with such networks being represented in FIG. 2 by network cloud 245.

Likewise, CSR station 200 includes with its PC or other computer a display 205, pointing device 215 and keyboard 220. Also shown at CSR station 200 is telephone 225, which in keeping with common usage will include a headset with microphone input permitting a CSR to operate hands-free in selecting and entering data into the PC at CSR station 200.

In conducting normal customer-CSR transactions, a customer at customer station 270 will typically browse a merchant's web site, which is illustratively served by merchant web server 282 with its web page catalog or the like for informing prospective customers about products, services or information of any kind. Upon viewing the web site a customer will typically have questions about available merchant products or the like, or will wish to place an order. At this time, either by placing a telephone call through a connection over the PSTN, 230, or by clicking on a button on the web site content displayed on the display unit of customer station 270, the customer is put in voice contact with a CSR such as the CSR at CSR station 200 over a voice link through data networks 245. If necessary, this call can be bridged or otherwise forwarded via a VOIP. gateway, such as 231 in FIG. 2 to permit a voice link to be extended through PSTN 230 to CSR telephone station 225. Preferably, however, CSR station 200 will additionally include VOIP facilities that will be operative using links from the computer at CSR station 200 through network(s) 245 to other VOIP destinations, such as customer PC 270 in the illustrative scenario under discussion.

In any event, call control center 290 (with associated database 291) and, where appropriate, merchant PBX/ACD 280 (with associated database 281), will establish the necessary links between a customer and a CSR location to permit a transaction to be completed. Typical transaction processing will include activities both at a customer station such as station 270 and at a CSR station such as station 200, such activities illustratively including viewing at least some common web pages, entering clicks or item identification for selections, and conducting a voice conversation between the two stations. In addition to supplying web page catalog-like information and other promotional and procedural information, merchant web server 282 will advantageously supply any needed electronic forms, and will receive completed order forms, credit card or other customer purchase information (and any other appropriate transaction data) during the course of the transaction. These and other aspects of a normal transaction are described in one or more of the incorporated patent applications.

Also included in FIG. 2 is monitor workstation 250 including a display 255, mouse (and/or other pointing/selecting device) 265 and keyboard (and/or other data entry device) 270. Monitor station 250 also is shown with a telephone station 240 connected to PSTN 230, but will also advantageously include VOIP facilities for voice communications directly over one or more data networks 245.

Virtual Network Computing (VNC) Elements and Processing

Virtual Network Computing (henceforth VNC) is a software system described, for example in T. Richardson, Q. Stafford-Fraser, K. R. Wood, "Virtual Network Computing,"

*IEEE Internet Computing*, January–Febuary 1998, pp. 33–38. When elements of VNC software are available on a set of computers, even computers of different kinds with different native operating systems, VNC provides access from ones of these computers to the applications, data, and desktop environments of others of these computers. More generally, computers properly conditioned with VNC software, and with access to a network, such as the Internet, can access and operate similarly conditioned remote computer in the same manner as if present at the remote computer. Moreover, whenever a VNC desktop is accessed, its state and configuration (including the position of a cursor) are exactly the same as when it was last accessed. Such access at different times can be by way of different computers with exactly the same result.

VNC software runs on a wide variety of hardware/software platforms, including Microsoft Windows 3.x/95/98/NT/CE, Linux 2.x for x86, Solaris 2.5 (Sun Sparc workstation), Apple Macintosh, and other generally available platforms. VNC software comprises two principal parts: a viewer for generating a display, and a server for drawing a display on a display device. A viewer may run on one platform and a server on a different platform while communicating and interacting in the manner described above. Since no state is stored at the view, breaking a connection from a viewer to the server and then reconnecting (at the same or another viewer) will not result in a loss of data. While other interconnection methodologies are used with VNC, a primary connection mechanism is using the Internet, with each of the server and viewer being at identified IP addresses or the equivalent.

Ready-to-run VNC software modules for a wide variety of platforms (and source code for VNC modules) is available for download free of charge at http://www.u.k.research.att.com/vnc/. Also available by selection and links from this URL is a wide variety of background, tutorial, development and other information that may prove helpful to users and developers of VNC applications.

In an exemplary VNC session employing a Unix- or Solaris-based server, a user can start a new server by typing vncserver. If the user is at a PC running MS Windows it may be necessary to send a message to a Unix/Solaris machine to obtain a shell into which the vncserver command is typed. Other adaptations of the vncserver are described in the online documentation accompanying the downloadable programs at the above-identified URL. Such adaptations will typically include setting up password and authorization processes well known in the art and described in the cited documentation.

Once a VNC server is installed on a first machine, a viewer installed on a second machine can access a desktop associated with the server by running the viewer and supplying appropriate identification for the server host machine and the server executing on the server machine. Upon initial connection, a password protocol will typically be used to assure the authenticity of the user of the viewer. Various shortcuts can be employed to streamline the connection process, as are well known in the art and described in the documentation available at the above-identified URL.

Once a viewer is linked to a server, the viewer display presents the identified desktop and a user at the view location can manipulate objects in the same way as a user at the server location. Changes in the server display are reflected at the viewer in real time, subject only to communications delay. The viewer may operate on various platforms, including a personal computer, a server, a handheld device or any device with appropriate processing and display functionality amenable to connection to a network—illustratively employing standard IP protocols.

Application of VNC to VCC Monitoring

Voice monitoring of CSRs by a monitor is described in the above-incorporated patent applications and is well known in the call center art generally. See, for example, the Muraskin article, supra. For present descriptive purposes, voice monitoring of CSRs by a monitor may be accomplished in standard manner. Alternatively, when a monitor is employing one or more VOIP links with a CSR, these links may be considered part of the desktop of the CSR and are monitored in the same fashion as displayed objects.

In VCC systems of the type described in incorporated patent applications (i) and (ii) and further described above, a monitor typically logs in to a call control server in the same manner as a CSR, but will generally enjoy additional privileges, including authorization to be connected (through a network switch and/or by direct IP connection) to CSR station sessions.

While monitor viewing of web pages under consideration by a CSR during a customer transaction affords limited access to the visual aspects of the transaction, VNC technology provides full access and control of the CSR desktop, including any merchant application pages under consideration, by the monitor. That is, using the VNC technology described above and, in particular the server and view software available as described above, a monitor in a VCC can not only monitor the progress of the voice part of a customer/CSR transaction, but can actively take part in all aspects of the transaction and can assume control of the transaction, or part of it, from the CSR. Because actions by a monitor at a VNC viewer location can select, enter data and otherwise direct a transaction displayed at a CSR's VNC server location, the monitor can selectively guide. or reverse CSR actions as necessary. When the monitor's actions relating to the CSR desktop cease, the CSR can pick up progress of the transaction at that point and continue to completion with the transaction—subject, of course, to subsequent assertion of control by the monitor.

FIG. 2 illustrates elements used in carrying out this operational sequence. Thus, VNC server software loaded at computer 200 permits the displayed merchant application (blank or partially filled-in forms, catalog entries, descriptive materials, etc.) to also appear on the viewer-enabled monitor workstation 250. When requested by a CSR, by random selection among many CSRs for quality monitoring, or at other times, a monitor need only select the CSR station to be viewed and send an appropriate message to establish a link to that CSR station to begin monitoring. Advantageously, a monitor will be logged in as a viewer on all or some subset of all logged-on CSRs, and merely selecting an icon or table entry will activate the required connection. A table such as that shown in FIG. 3 will prove useful in some monitoring circumstances. Any number of other descriptive fields may be added to the table as will suit a particular VCC and particular merchant applications.

Figure 3:
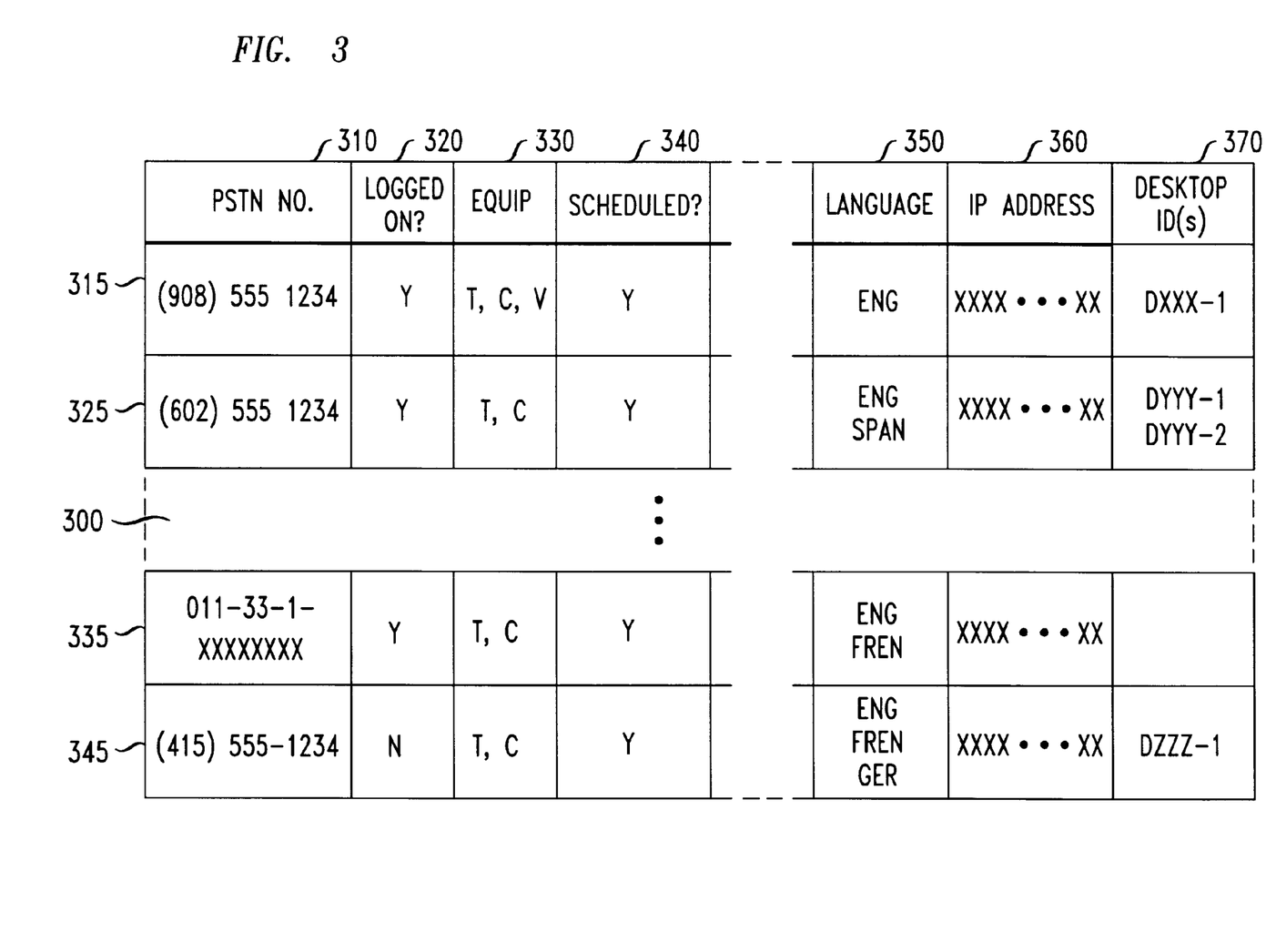
FIG. 3 shows a table useful for storing CSR information, including IP address and desktop ID information, useful in practicing illustrative embodiments of the present invention.

The illustrative table of FIG. 3 includes columns associated with respective illustrative information fields 310, 320, 330, 340, 350, 360 and 370 and rows 315, 325, 335 and 345 associated with individual CSRs. Field 310 is used to store one or more PSTN numbers and illustrative field 360 a permanent (or temporary) IP address and field 370 the desktop ID(s) associated with customer transactions, while illustrative field 330 shows equipment or other station features associated with a particular CSR. Thus, the station for the CSR associated with row 315 is shown with T, C, V to indicate that the CSR station includes not only the standard telephone and computer facilities, but also video equipment to take part in video sessions with calling customers (or others) preferring such sessions. Since the results of actions in each hardware-specific session may be viewed as an application displayed on the desktop at a CSR location (having the required hardware/software), a server session running at that CSR location can be shared using the above-described VNC server software.

Other fields in the table of FIG. 3 relate to status of particular CSRs and are useful, for example, to help avoid attempts at monitoring logged-off CSRs. Thus, field 320 is shown reflecting the actual logged-on (or not) status of each CSR. As shown by illustrative CSR entries, a CSR station subject to monitoring using the presently described techniques may be in any country that can be reached using a PSTN number or IP address.

In addition to the above-described table fields (and many more indicating a range of CSR skills or activities, system operator information—such as hours worked, etc., and merchant-specific, or merchant application-specific associations with particular CSRs) it proves convenient to maintain a field 350 including language skills of each CSR. By way of example, CSR associated with row 315 is shown having English language skills, while the CSR associated with row 325 is shown as having both English and Spanish language skills. The CSR associated with row 335 is seen to have English and French language skills, and have an international PSTN number associated with Paris, France. Such language information (or other CSR-specific information) may influence a monitor's approach to entering a transaction involving a particular CSR.

It will prove advantageous in many circumstances to have both VNC server and VNC viewer software loaded at each station, so that desktop applications and content created or available at one station (whether a supervisor, monitor or CSR station) available to others in the VCC community. Of course suitable access permissions will be introduced to ensure security of non-public or other valuable information. It will prove useful in some cases to have a monitor and a CSR conduct a desktop sharing session separate from an ongoing transaction. Thus, to avoid unnecessarily involving a customer, or to provide follow-up to an earlier transaction, among many other reasons, a monitor may meet a CSR in a separate shared-desktop session. Likewise, a CSR may conduct a transaction in a first session with a customer while exposing only so much of a merchant application as is necessary for the customer to effectively participate. Simultaneously, the CSR may pursue a second session with a merchant server, such as server 282 in FIG. 2. In monitoring the CSR, the monitor may select one or more of the active sessions at a CSR location (each associated with a VNC server) to monitor. Active participation by a monitor in one CSR session not involving a customer (but involving the merchant server or a merchant-specific application, e.g., involving pricing or scheduling) can then direct the CSR in an appropriate direction in respect of another CSR session in which the customer is participating.

Monitors will typically establish desktop identification at particular CSR stations that will be used for customer transactions and enter such information in a field such as field 370 in the table of FIG. 3. Connection to such one or more desktops at respective CSR locations are then established using the desktop ID(s), along with IP address for that CSR. The monitor is then prepared to monitor and control transactions in progress in merchant applications on such desktop(s). Particular IP addresses and/or desktop identifications may be supplied by call control server, either routinely or upon the occurrence of a particular event, such as receipt of a message requesting assistance by a CSR, e.g., one originated by clicking on a button or icon on said CSR desktop. Thus, upon receipt of a request for help at said call control server 290, an available monitor will be dispatched to establish a link to the CSR requiring assistance.

While monitors at respective monitor stations will in many cases identify and/or store CSR IP and desktop information for periods in which such information remains constant, many VCC contexts will employ temporary IP addresses active only for each logged-in CSR session. When a CSR logs out, such information may become stale and not useful upon a subsequent login. In these cases, call control server 290 in the course of authenticating CSR stations during login will illustratively assign IP addresses and direct that particular desktop identification be used for one or more desktop(s) used for customer transactions. Such IP addresses and desktop identification are conveniently stored in table form at call control server 290. Then, when a monitor logs in or is assigned duties as a monitor, call control server 290 provides this information in an updated table illustratively in the form of the table in FIG. 3.

Because a single server session at a monitor location can be simultaneously viewed by a number of CSRs or others running a viewer logged-in to the monitor server session, information of general interest can be provided simultaneously to group of CSRs using aspects of the present invention.

Though solutions provided by the present invention are relevant to virtual call center contexts, it will be recognized that other contexts involving mobile workers or those having a plurality of work locations will benefit from use of the present invention. Further, workers other than CSRs who are at large, or work at home or in other virtual office locations—such as those described in U.S. patent applications Ser. No. 09/370766, filed Aug. 8, 1999 and assigned to the assignee of the present application, and the above-incorporated application Ser. No. 09/318,015—will employ the present inventive techniques while remaining accessible to their employers, customers, clients, colleagues and others. The aforesaid application Ser. No. 09/370766 is hereby incorporated by reference and considered set out in its entirety herein. Accordingly, references to CSRs in the context of illustrative virtual call centers will in appropriate cases be understood to include other personnel not-logged-in to a particular network or server, but who are in demand based on conditions existing in or on such network or server or conditions arising from contacting person requirements. These personnel will include not only CSRs, multiple-location personnel, travelers and remotely located or in-the-field employees, but those at large personnel who—though not logged in—are reachable by appropriate alerting or messaging techniques, such as those described in incorporated application (vi) cited above.

The term virtual contact center should be understood to embrace such in-the-field, traveling or virtual office contexts, as well as illustrative virtual call center contexts described above and in some or all of the previously filed incorporated co-pending patent applications. Moreover, virtual contact center will be understood to include network-based systems, methods and techniques for processing voice and non-voice contacts, including instant messaging or other messaging contacts (such as e-mail, chat, voice chat or similar contacts). The virtual contact center label is to be understood to apply whether customer or other contacts are referred to as calls, messages or otherwise. Likewise, transaction will be understood to include the wide variety of activities and information exchanges common in networked distributed communications systems, and is not limited to sales transactions appropriate to some illustrative sessions subject to monitoring and control.

While particular monitoring and control (viewing) programs and systems have been described, it will be understood that other such viewing programs may be used as will be appropriate to particular contexts.

While desktop is commonly used as a metaphor for the viewable portion of a computer user's screen analogous to a physical desktop with documents visible thereon, it should be understood that desktop as used herein also includes executable objects and voice and other communications objects.

Numerous and varied other modifications and extensions within the inventive scope of the presently claimed invention will occur to those skilled in the art in light of the present disclosure.

What is claimed is:

1. In a network-based virtual contact center comprising at least one customer service representative (CSR) station and a contact control server for authenticating CSRs at said CSR stations and for connecting customers to said CSR stations, a method for monitoring and controlling at least one merchant application relating to a transaction between a customer and a CSR at one of said CSR stations, said CSR station comprising a computer having at least one displayable desktop, the method, practiced at a monitor station, comprising executing a viewer program associated with a server program and a first desktop at said one of said CSR stations, establishing a first link to said one of said CSR stations to permit display at said monitor station of said first desktop at said one of said CSR stations, inputting control signals for transmission over said first link to control objects on said first desktop at said one of said CSR stations.

2. The method of claim 1 wherein said objects on said desktop comprise a voice object relating to voice communications between said customer and said CSR, and wherein said inputting comprises voice inputs.

3. The method of claim 1 further comprising establishing a separate voice link between said monitor station and said CSR station bridged to voice communications between said CSR and said customer.

4. The method of claim 3 wherein said separate voice link is bridged to at least one voice object on said first desktop.

5. The method of claim 1 wherein said establishing comprises specifying an IP address to said viewer program, said viewer program being responsive to said IP address for completing a link to said CSR station.

6. The method of claim 5 wherein said establishing further comprises specifying desktop identification for said first desktop to said viewer program, said viewer program being responsive to said desktop identification for completing a link to said first desktop at said CSR station.

7. The method of claim 1 wherein said inputting of control signals comprises entering data via a keyboard to supply information to said at least one merchant application.

8. The method of claim 1 wherein said inputting of control signals comprises entering selections from possible inputs presented by said at least one merchant application.

9. The method of claim 1 comprising executing a server program associated with a desktop at said monitor station that is accessible by one or more CSR stations.

10. The method of claim 1 further comprising executing a viewer program associated with a server program and each of at least one other desktop at said one of said CSR stations, establishing a second link to said one of said CSR stations to permit display at said monitor station of said at least one other desktop at said one of said CSR stations, inputting control signals for transmission over said second link to control objects on said at least one other desktop at said one of said CSR stations.

11. In a network-based virtual contact center comprising at least one customer service representative (CSR) station, at least one monitor station, and a contact control server for authenticating CSRs at said CSR stations and for connecting customers to said CSR stations, a method for facilitating monitoring and control of at least one merchant application relating to a transaction between a customer and a CSR at a first of said CSR stations, said first CSR station comprising a computer having at least one displayable desktop, the method, practiced at said contact control center, comprising upon successful login of said one of said CSR stations with said contact control server, providing said first of said CSR stations with an IP address and at least one desktop ID identifying respective desktops to be used for running merchant applications involved in transactions with customers, directing said first of said CSR stations to execute a server program associated with each of said desktops for which desktop IDs have been provided, and upon successful login of said monitor station with said contact control server, providing said monitor station with information identifying said first of said CSR stations and said IP address and desktop IDs for said first of said CSR stations.

12. The method of claim 11 further comprising directing said monitor station to execute a viewer program associated with a server program and at least one of said desktops associated with said desktop IDs for said first of said CSR stations.

13. The method of claim 12 further comprising establishing a communications link between a contacting customer and said first of said CSR stations for conducting a transaction between said customer and said first of said CSR stations on a desktop associated with at least one of said desktop IDs.

14. In a network-based virtual contact center comprising at least one customer service representative (CSR) station, at least one monitor station, and a contact control server for authenticating CSRs at said CSR stations and for connecting customers to said CSR stations, a method for facilitating monitoring and control of at least one merchant application relating to a transaction between a customer and a CSR at a first of said CSR stations, said first CSR station comprising a computer having at least one displayable desktop, the method, practiced at said first CSR station, comprising upon successful login with said contact control server, receiving an IP address and at least one desktop ID identifying respective desktops to be used for running merchant applications involved in transactions with customers, executing a server program associated with each of said desktops for which desktop IDs have been provided, and upon successful login of a monitor station running a viewer program corresponding to each of said server programs participating in the linking of said server programs with corresponding viewing programs at said monitor, and while executing at least one merchant application on at least one of said desktops during a transaction with a customer, receiving information from said monitor to influence the further execution of said merchant applications.

15. In a network-based virtual contact center comprising a set of first client stations comprising at least one client station and a contact control server for authenticating first clients at respective ones of said client stations, and for selectively connecting other client stations to said first client stations, a method for monitoring and controlling at least one application relating to a communication between at least one first client station and another client station, said first client stations comprising a computer having at least one displayable desktop, the method, practiced at a monitor station connected in said network, comprising executing a viewer program associated with a server program and at least a first desktop at said first client stations, establishing a first link to said first client stations to permit display at said monitor station of said at least a first desktop at said one of said first client stations, inputting control signals for transmission over said first link to control objects on said first desktop at said first client stations.

16. The method of claim 15 wherein said objects on said at least a first desktop comprise a voice object relating to voice communications between said one of said first client stations and said other client station.

17. The method of claim 15 wherein said objects on said at least a first desktop comprise a non-voice object relating to communications between said one of said first client stations and said other client station.

18. The method of claim 17 wherein said non-voice object is a data message object.

19. The method of claim 18 wherein said data message is an e-mail message.

20. The method of claim 18 wherein said data message is an instant messaging message.

21. The method of claim 18 wherein said data message is a chat message.

22. The method of claim 16 wherein said object is a voice chat message.

* * * * *